United States Patent
Lo et al.

(10) Patent No.: US 6,711,736 B1
(45) Date of Patent: Mar. 23, 2004

(54) METHOD OF OBTAINING THE BIOS VERSION DATE IN THE WINDOWS OPERATING SYSTEM

(75) Inventors: Chiang Lo, Tianjin (CN); Tong S Chen, Taipei (TW); Kuang-Shin Lin, Taipei (TW)

(73) Assignee: Inventec Corporation, Taipei (TW)

( * ) Notice: Subject to any disclaimer, the term of this patent is extended or adjusted under 35 U.S.C. 154(b) by 539 days.

(21) Appl. No.: 09/706,799

(22) Filed: Nov. 7, 2000

(51) Int. Cl.$^7$ ................................................. G06F 9/44
(52) U.S. Cl. ........................................................ 717/168
(58) Field of Search ................................. 717/168–178; 711/109.1, 100, 200–221

(56) References Cited

U.S. PATENT DOCUMENTS

| | | | |
|---|---|---|---|
| 5,473,775 A | * 12/1995 | Sakai et al. | 713/2 |
| 5,805,882 A | * 9/1998 | Cooper et al. | 713/2 |
| 5,809,555 A | * 9/1998 | Hobson | 711/172 |
| 5,835,960 A | * 11/1998 | Keene et al. | 711/172 |
| 5,960,445 A | * 9/1999 | Tamori et al. | 707/203 |
| 6,182,188 B1 | * 1/2001 | Hasbun et al. | 711/103 |
| 6,401,198 B1 | * 6/2002 | Harmer et al. | 713/1 |
| 6,438,711 B2 | * 8/2002 | Woodruff | 714/27 |
| 6,513,159 B1 | * 1/2003 | Dodson | 717/178 |

OTHER PUBLICATIONS

Jex. Flash memory BIOS for PC and notebook computers. IEEE. pp. 692–695, 1991.*

* cited by examiner

Primary Examiner—Wei Zhen
(74) Attorney, Agent, or Firm—Birch, Stewart, Kolasch & Birch, LLP

(57) ABSTRACT

A method of obtaining the BIOS version date in the windows operating system using dynamic virtual device drivers (VxDs). First, input and output parameter buffers are defined and the initial address and area size of search memory are obtained. The physical address is mapped to a linear address. After initializing the address shift, the system makes sure the shift is smaller than the memory size minus 8. The system then checks that the address pointed by the initial address plus the shift contains a number. The address of the number is taken as the base address. The values in the zeroth through the ninth bytes of the base address are preserved and returned to the application routine, giving the BIOS version date.

12 Claims, 3 Drawing Sheets

METHOD OF OBTAINING THE BIOS VERSION DATE IN THE WINDOWS OPERATING SYSTEM

BACKGROUND OF THE INVENTION

1. Field of Invention

The present invention relates to a method of obtain the BIOS version date in the windows operating system and, in particular, to a method of obtaining the BIOS version date in the windows operating system using dynamic virtual device drivers (VxDs).

2. Related Art

Due to the rapid development in computer hardware technologies, the BIOS is changed and upgraded by the computer manufacturers all the time. Since different BIOS's support different hardware and services, it is thus very important to be able to obtain the BIOS version date to facilitate the programming of software that performs hardware tests.

In the conventional DOS, the BIOS version date can be obtained by reading the fixed BIOS memory. However, the windows operating system does not allow application routines to directly accessing the memory. Therefore, there is a difficulty in obtaining the BIOS version date in the windows operating system.

SUMMARY OF THE INVENTION

The method of obtaining the BIOS version date in the windows operating system disclosed by the present invention uses a dynamic virtual device driver (VxD) to implement the retrieval of the BIOS version date in the windows operating system. Utilizing the feature that the VxD can run in RING0 privilege and by defining the structure of input and output parameters, the disclosed method can obtain the system BIOS version date and the video BIOS version date from the BIOS.

Taking a system information display in a notebook computer test procedure Evolution as an example, the system BIOS version date and the video BIOS version date have to be displayed. After loading in the BIOSDATE.VxD, define in the input parameter structure that StartAddress is 0xffff0, PrepareSize is 0x400(1K). Using the READDATE function in the VxD, the value of CatchedValue in the return value structure is the expected system BIOS version date.

Defining In the output parameter structure that StartAddress is 0xc0000, PrepareSize is 0x400. Using the READ-DATE function in the VxD again, the value of CatchedValue in the return value structure is the expected video BIOS version date.

Other features and advantages of the present invention will be apparent from the following detailed description, which proceeds with reference to the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
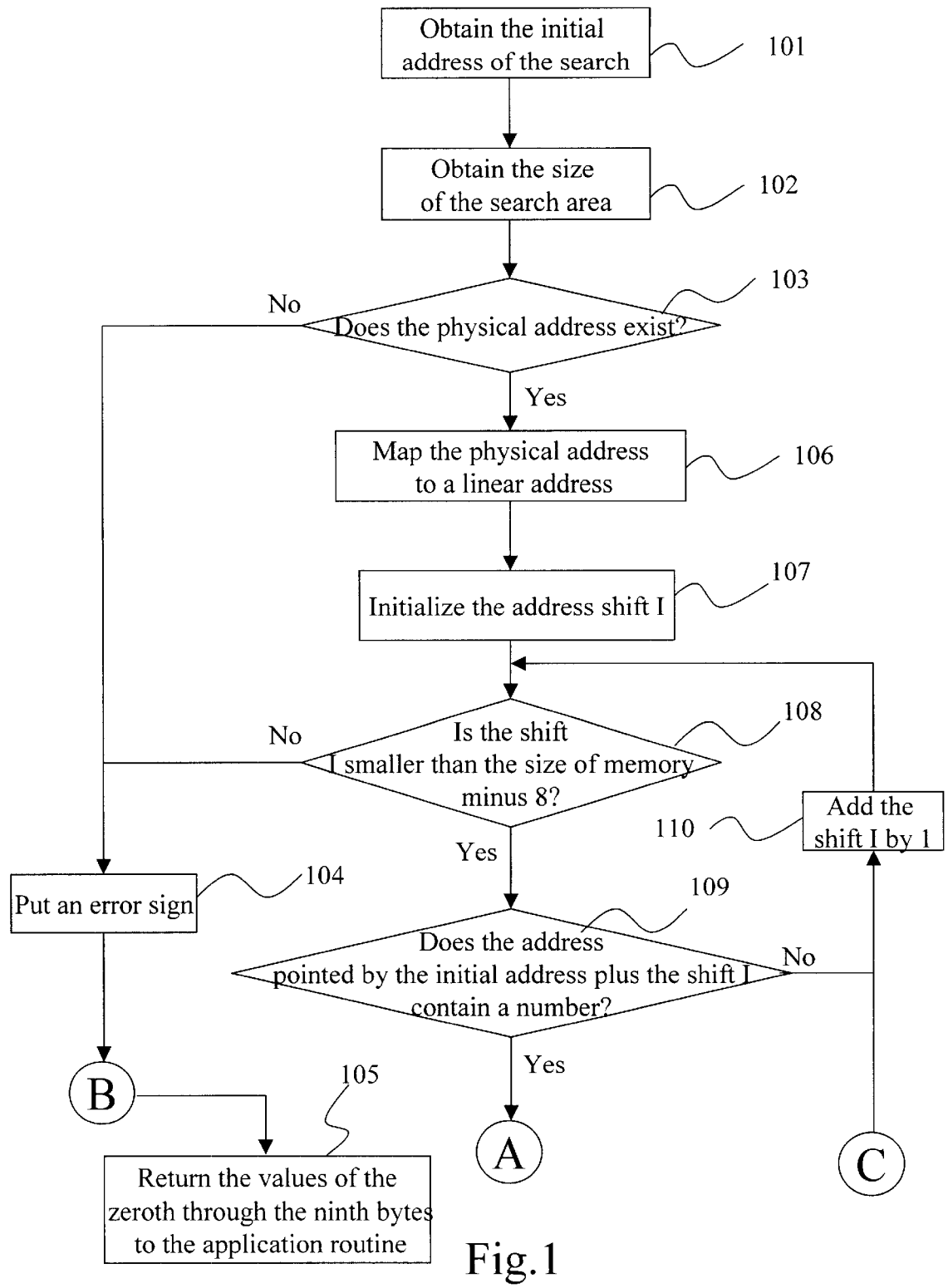
FIGS. 1 through 3 show the flow charts of how to explicitly implement the retrieval of the BIOS version date in the windows operating system according to the present invention.

The primary object of the present invention is to implement the method of obtaining the BIOS version date in the windows operating system using dynamic virtual device drivers (VxDs) so that the programmer can readily the BIOS version date while programming a windows application routine.

For Intel x86 series processors, there are four ring privileges under the protected mode, namely RING0, RING1, RING2. and RING3. Different rings provide different forms of protection and different levels of protection, indicating different privileges to storage devices. RINGx mean that the structure of the operating system is like several concentric circular rings. The innermost one is the kernel, called RING0. The farther away ring is closer to the user level. RINGx are a design under the x86 structure, but the operating system. Most central operating units (CPUs) have only a privilege mode and a normal mode, whereas x86 separates them into four modes, RING0 through RING3. The usual operating system only uses RING0 and RING3 under the consideration of platform differences. Even though there are RING1 and RING2 in the protected mode of x86, very few people use them.

Therefore, the windows operating system uses two categories: operations are carried out in RING0 and application programs run in RING3. Only programs in RING0 can perform direct I/O operations on the BIOS memory. The windows operating system does not support application programs to perform direct I/O operations on hardware. Nevertheless, it has a class of special programs, namely the virtual device drivers (VxDs). The VxD can run in RING0 and execute all system operations. The purpose of the VxD design in the windows operating system is to provide a mechanism to share a common external device without through an application program. That is, one can use his VxD to replace the VxD provided by the system, gaining control of reading the BIOS memory for the windows. application routine to obtain the BIOS version date from the memory.

The information exchange between the VxD and the windows application routine is mainly through the application program interface (API) DeviceIOControl function. The parameters of this function contain a pointer pointing to an input buffer and a pointer pointing to an output buffer. Through these two buffers, necessary parameters can be transferred to the VxD and the result can be returned to the application routine. Of course, before using the DeviceIO-Control function, the corresponding VxD has to be loaded. The VxD is unloaded after the service.

In general, the BIOS version date is put at a fixed location in the BIOS memory. It is kept within the first 8 or 10 byte space beginning from the physical address 0xffff4. Since the physical address refers to the actual memory address in the computer memory, the system program design would become much easier if the computer system adopts physical addresses. Each physical address will be expressed in a linear method and this method is unique. However, in the virtual memory system part of the hard disk drive (HDD) space can be used as part of the memory, therefore it is impossible for all memory to have physical addresses.

The time format of the BIOS memory is generally fixed. The month, day and year are separated by the symbol "/". More explicitly, there are the following forms: (1) month/day/year, including xx/xx/xx and xx/xx/xxxx (x=0, 1, ... 9); (2) year/month/day, including xx/xx/xx and xxxx/xx/xx (x=0, 1, . . . 9). Since the time format is very special, therefore if xx/xx/xx or xxxx/xx/xx is found when searching the physical memory, one can be sure that it indicates a time. Searching downwards from the address 0xffff0 in the special BIOS memory, the first time found is the desired BIOS version date. Analogously, searching downwards from the address 0xc000, the first time found is the video BIOS version date.

Figure 2:
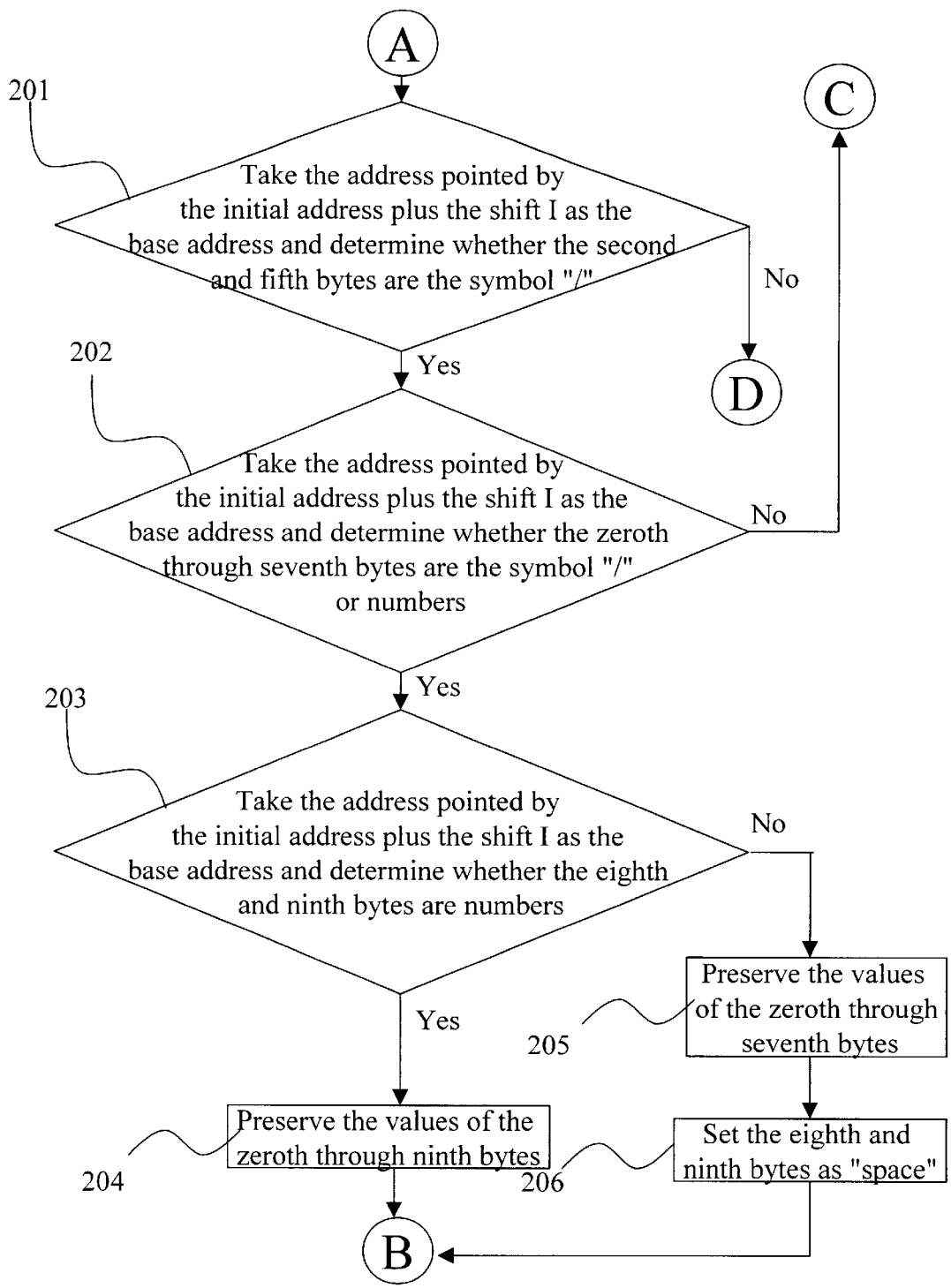
Figure 3:
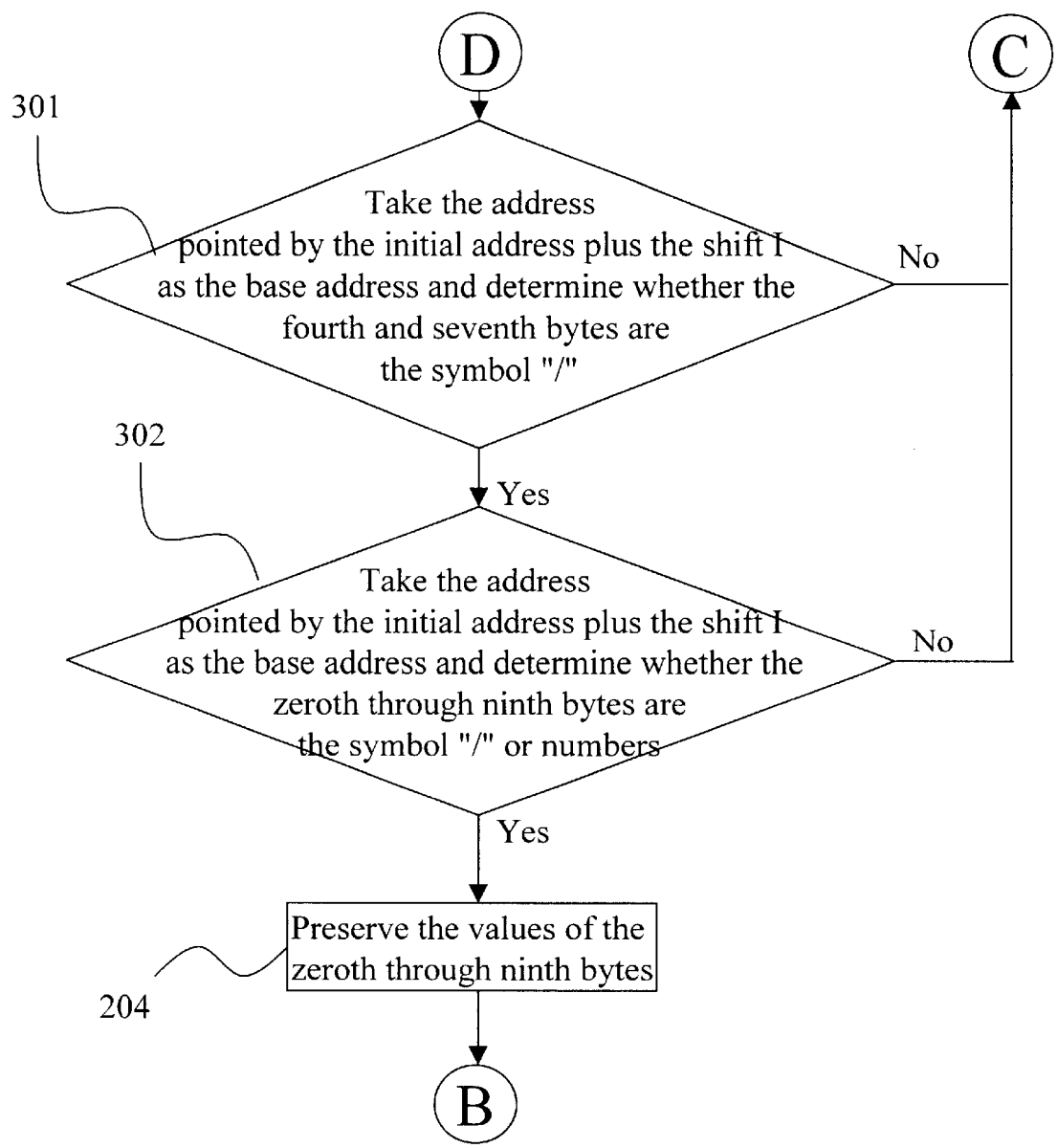

FIGS. 1 through 3 show the flow charts of how to explicitly implement the retrieval of the BIOS version date in the windows operating system according to the present invention. Before obtaining the BIOS version date from the VxD, the structures of input parameters and output parameters have to be defined:

1. Define input parameters:

To make the VxD function of accessing the BIOS memory.unanimous at least two parameters are needed. One is the initial address of the search memory, such as the address 0xffff0 for searching the BIOS version date and the address 0xc000 for searching the video BIOS version date. The other is the size of the search memory, i.e., the possible size of the area that the time may exist in. Therefore, the structure of the input parameters is defined as:

```
typedef struct
{
    DWORD StartAddress;
    DWORD PrepareSize;
}InputBuffer;
```

Define output parameters:

According to the input parameters, the VxD performs searching within the BIOS memory, finds the desired time values, and returns the times values to the windows application routine that calls for the VxD. Therefore, it is necessary to define a string of at least 10 bytes of characters in order to receive the search result. Therefore, the structure of the output parameters is defined as:

```
typedef struct
{
    char CatchedValue[10];
}OutputBuffer;
```

The input parameter buffer pointer of the VxD is turned into a self-defined InputBuffer type pointer to obtain the initial address of searching (step 101) and the size of the search area (step 102). The system then determines whether a storage block exists in the physical addresses (step 103). If not, an error sign is associated thereto (step 104) and the values in the zeroth through ninth bytes are returned to the application routine step (105). If the storage block exists, the physical address is mapped to a linear address (step 106). The linear address refers to an expression method in which the addresses of the memory units in the operating system are continuous and unique.

The disclosed method uses the address obtained by adding the base address by a shift to access memory. Thus, the address shift I has to be initialized (step 107). Since the BIOS version date format needs at least 8 bytes, therefore if the data stored in the address of size-8

According to the determination method of the invention, the time format has two types: xx/xx/xx and xx/xx/xxxx as one type, which are common in that the second and fifth bytes are the symbol "/", and xxxx/xx/xx is the other, where the fourth and seventh bytes are the symbol "/". The address pointed by the initial address plus the shift I is taken as the base address. The method then determines whether the second and fifth bytes are the symbol "/" (step 201). If not, then the system executes step D (FIG. 3). The address pointed by the initial address plus the shift is taken as the base address and the system determines whether the fourth and seventh bytes are the symbol "/" (step 301). If not, then the procedure goes back to step C. If they are, then the address pointed by the initial address plus the shift I is taken as the base address and the system determines whether the zeroth through the ninth bytes are the symbol "/" or numbers (step 302). If not, then the procedure goes back to step C. Otherwise, the values of the zeroth through ninth bytes are kept (step 204) and the procedure goes back to step B In step 201, if the answer is yes, then the address pointed by the initial address plus the shift I is taken as the base address and the system determines whether the zeroth through seventh bytes are the symbol "/" or numbers (step 202). If not, then the procedure continue to step C; otherwise, the address pointed by the initial address plus the shift I is taken as the base address and the system determines whether the eighth and ninth bytes are numbers (step 203). If yes, then the values of the zeroth through ninth bytes are kept (step 204) and the procedure goes back to step B; otherwise, the values of the zeroth through seventh bytes are kept (step 205). The eighth and ninth bytes are set to be "space" and the procedure foes back to step B.

After describing the method hereinbefore, an explicit example is further provided to illustrate the feasibility of the present invention: The system information display in a notebook computer test procedure Evolution needs to display the system BIOS version date and the video BIOS version date of the BIOS. After loading in BIOSDATE.VxD, define in the input parameter structure that StartAddress is 0xffff0 and PrepareSize is 0x400(1K). Using the READDATE function in the VxD, the value of CatchedValue in the return value structure is the desired system BIOS version date.

Define in the output parameter structure that StartAddress 為 0xc0000, PrepareSize 為 0x400. Using the READDATE function in the VxD again, the value of CatchedValue in the return value structure is the desired video BIOS version date.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of obtaining the BIOS version date in the windows operating system, which comprises the steps of:

defining input and output parameter buffers;

obtaining the initial address and area size of search memory;

mapping physical addresses to linear addresses;

initializing an address shift;

making sure that the shift is smaller than the memory size minus 8;

making sure that the address pointed by the initial address plus the shift is a number;

taking the address with the number as a base address and making sure that the second and fifth bytes are the symbol "/";

making sure that the zeroth through seventh bytes of the base address comprises the symbol "/" and numbers;

making sure that the eighth and ninth bytes are numbers; and keeping the values of the zeroth through ninth bytes of the base address and returning the values thereof to the application routine.

2. The method of claim 1, wherein the input parameters include the initial address and area size of the search memory.

3. The method of claim 1, wherein the output parameters include a string of at least ten bytes of characters for receiving the search result.

4. The method of claim 1, wherein the step of making sure that the second and fifth bytes are the symbol "/" is due to the time format of the BIOS version date.

5. The method of claim 4, wherein the time format includes xx/xx/xx and xx/xx/xxxx.

6. The method of claim 5, wherein each x of one of the xx and the xxxx of the time format is 0,1,2, . . . 9.

7. A method of obtaining the BIOS version date in the windows operating system, which comprises the steps of:

defining input and output parameter buffers;

obtaining the initial address and area size of search memory;

mapping physical addresses to linear addresses;

initializing an address shift;

making sure that the shift is smaller than the memory size minus 8;

making sure that the address pointed by the initial address plus the shift is a number;

taking the address with the number as a base address and making sure that the fourth and seventh bytes are the symbol "/";

making sure that the zeroth through seventh bytes of the base address comprises the symbol "/" and numbers;

making sure that the eighth and ninth bytes are numbers; and keeping the values of the zeroth through ninth bytes of the base address and returning the values thereof to the application routine.

8. The method of claim 7, wherein the input parameters include the initial address and area size of the search memory.

9. The method of claim 7, wherein the output parameters include a string of at least ten bytes of characters for receiving the search result.

10. The method of claim 7, wherein the step of making sure that the second and fifth bytes are the symbol "/" is due to the time format of the BIOS version date.

11. The method of claim 7, wherein the time format is xxxx/xx/xx.

12. The method of claim 11, wherein each x of one of the xxxx and xx of the time format is 0, 1, 2, . . . 9.

\* \* \* \* \*